United States Patent
Conrad et al.

(10) Patent No.: US 7,617,631 B2
(45) Date of Patent: Nov. 17, 2009

(54) PLANT CONTAINER SOIL COVER DEVICE

(75) Inventors: Barbara A. Conrad, 435 Belleview Ave., St. Louis, MO (US) 63119; Mark N. Stroyeck, 435 Belleview Ave., St. Louis, MO (US) 63119; Christopher Polley, Christopher, IL (US)

(73) Assignees: Barbara A. Conrad, St. Louis, MO (US); Mark N. Stroyeck, St. Louis, MO (US)

( * ) Notice: Subject to any disclaimer, the term of this patent is extended or adjusted under 35 U.S.C. 154(b) by 335 days.

(21) Appl. No.: 11/506,106

(22) Filed: Aug. 17, 2006

(65) Prior Publication Data

US 2008/0072481 A1   Mar. 27, 2008

(51) Int. Cl.
*A01G 9/00* (2006.01)
(52) U.S. Cl. ...................................... 47/31.1
(58) Field of Classification Search .............. 47/30, 47/32, 32.4, 31.1, 21.1
See application file for complete search history.

(56) References Cited

U.S. PATENT DOCUMENTS

| | | | |
|---|---|---|---|
| 3,891,423 A | 6/1975 | Stanley et al. | |
| 3,940,884 A | 3/1976 | Mason | |
| 3,961,443 A | 6/1976 | Insalaco | |
| 4,403,443 A | 9/1983 | Valente | |
| D291,049 S | 7/1987 | Haggard | |
| 4,712,239 A | 12/1987 | Frezza et al. | |
| D295,491 S | 5/1988 | Drumheller | |
| 4,977,703 A * | 12/1990 | Blanc | 47/84 |
| 4,995,192 A | 2/1991 | DeWid | |
| 5,003,724 A | 4/1991 | Vestuti | |
| D337,077 S | 7/1993 | Turley | |
| 5,325,627 A | 7/1994 | Anderson | |
| 5,425,204 A | 6/1995 | Holmes et al. | |
| 5,605,009 A | 2/1997 | Elder | |
| D437,194 S | 2/2001 | Rivas et al. | |
| 2005/0108932 A1 * | 5/2005 | Hsia | 47/32 |

* cited by examiner

*Primary Examiner*—Michael R Mansen
*Assistant Examiner*—Monica L Williams
(74) *Attorney, Agent, or Firm*—Polster, Lieder & Lucchesi, L.C.

(57) ABSTRACT

A soil cover device that removably secures to a plant container to restrict access to soil by children and pets, while facilitating the passage of air, water, and fertilizer to the soil through a plurality of openings. The soil cover device includes a plurality of partition members that removably secure with anchors, which partially imbed into the soil. When assembled, the partition members form an aperture for a plant to extend therethrough.

17 Claims, 5 Drawing Sheets

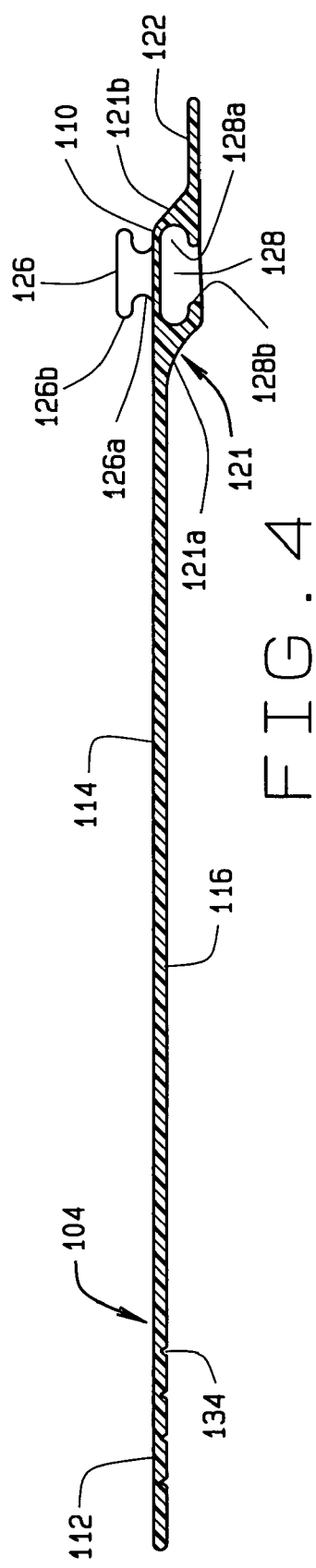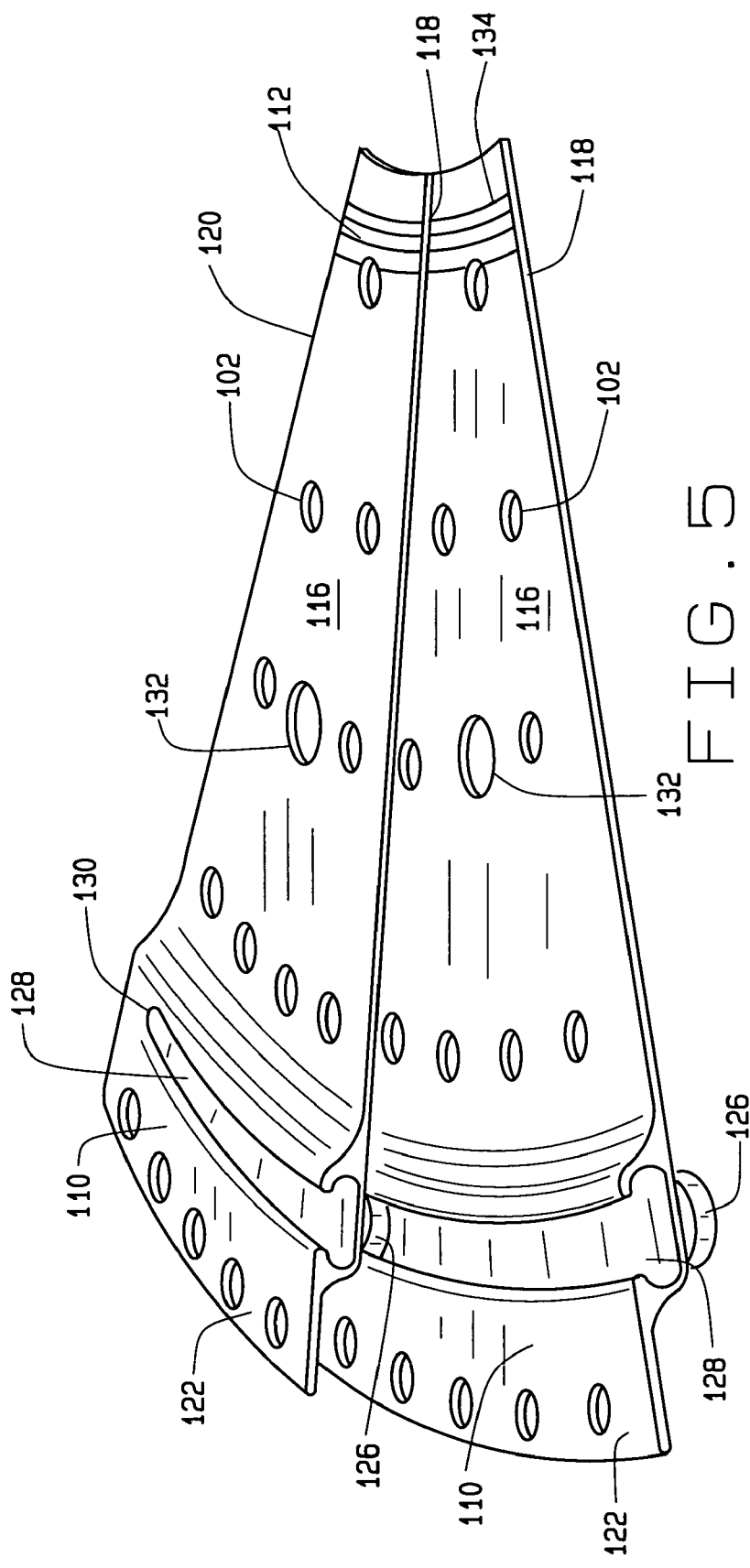

PLANT CONTAINER SOIL COVER DEVICE

CROSS-REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates generally to soil covers, and in particular to soil cover for plant containers.

As any pet owner or parent can attest to, plant containers can unexpectedly turn into litter boxes, can be knocked over by pets, children, or wind, or can be played in by children. Various types of plant container covers have been developed to protect the soil from children and pets and to prevent spillage of the soil, while still allowing air circulation, fertilizing, and watering. However, these previous designs all have drawbacks. Some are not adjustable to accommodate multiple sizes of containers with varying sizes of plants. Others do not adequately secure to the container and are too easily removed. Most are simply aesthetically displeasing, which detracts from the visual delight normally associated with growing plants. Overall, none of the previous designs have proven to be effective at providing aesthetically pleasing cover that is easy to securely install and remove, able to accommodate various size plant containers with various size plants, while allowing proper access for air circulation, fertilizing, and watering.

DESCRIPTION OF THE DRAWINGS

In the accompanying drawings which form part of the specification:

FIG. 4 is a sectional view of the first embodiment of the partition member along A-A of FIG. 3;

FIG. 5 is a bottom perspective view of two partition members engaged with each other;

Corresponding reference numerals indicate corresponding parts throughout the several figures of the drawings.

DETAILED DESCRIPTION

Figure 1:
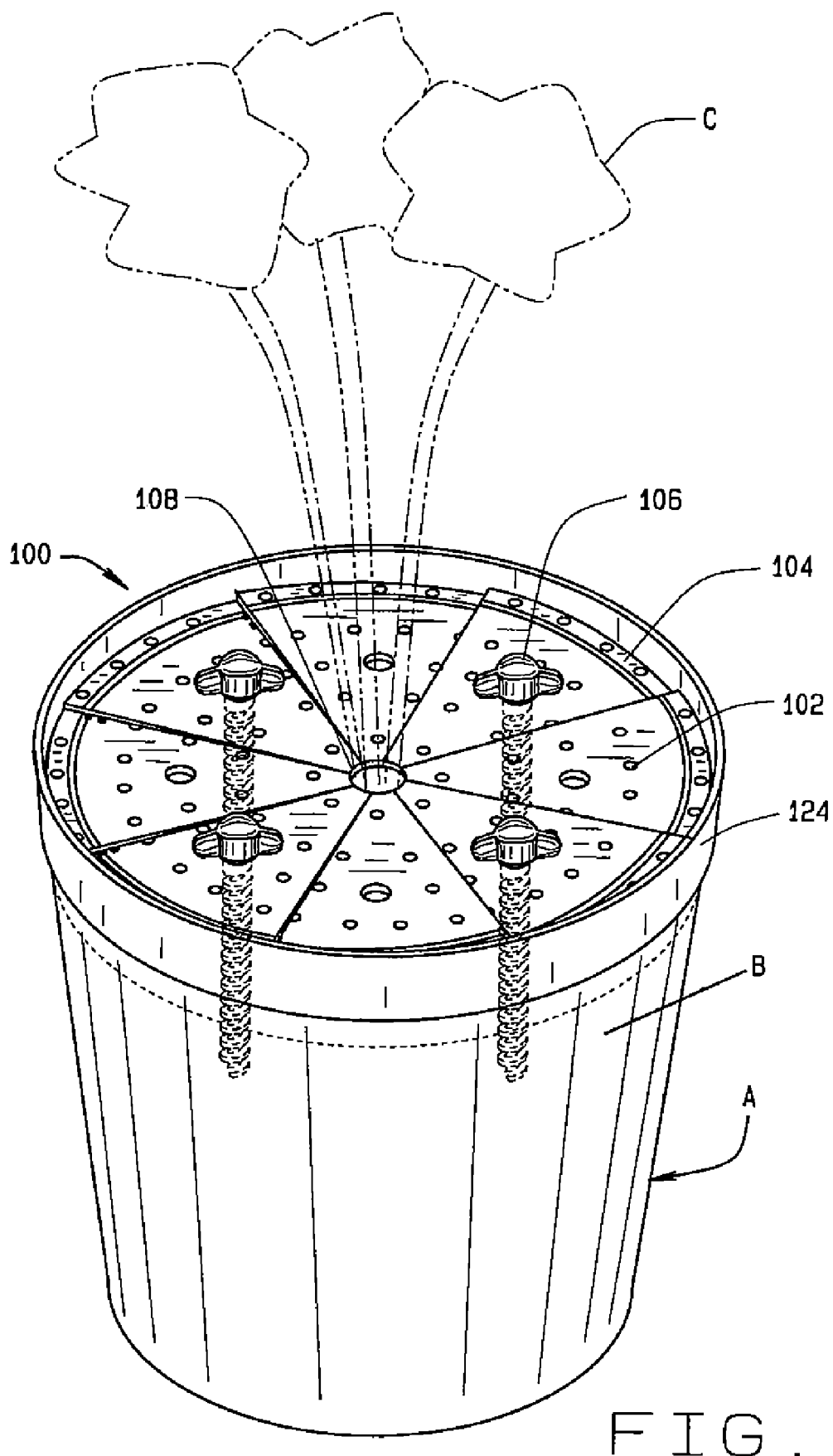
FIG. 1 is a perspective view of a soil cover device secured to a plant container, in accordance with and embodying the present invention.

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention. Additionally, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

As shown in FIGS. 1-6, a first embodiment of the present invention, generally referred to as a soil cover device 100, removably secures to an opening of a plant container A to restrict access to soil B therein by children and pets, while facilitating the passage of air, water, and fertilizer to the soil B through a plurality of openings 102. At least one of the openings 102 allows the passage of anchors 106, such as through hole 132. The openings 102 can be any shape or size, and in fact can be small so as to comprise perforations in the cover device 100. Further, the soil cover device 100 prevents spillage of the soil B if the container A is tipped over. The soil cover device 100 includes a plurality of partition members 104 and is removably secured in the container by anchors 106, which pass through the partition members 104 to at least partially imbed into the soil B. When assembled, the partition members 104 form an aperture 108 for a plant C to extend therethrough. The cover 100 of FIG. 1 includes four (4) anchors 106 and eight (8) partition members 104. Hence, an anchor 106 is not needed for each partition member 104. However, the number of anchors 106 to be supplied with the cover 100 will depend on the diameter of the assembled cover and the number of partition members 104 which make up the cover 100.

Figure 2:
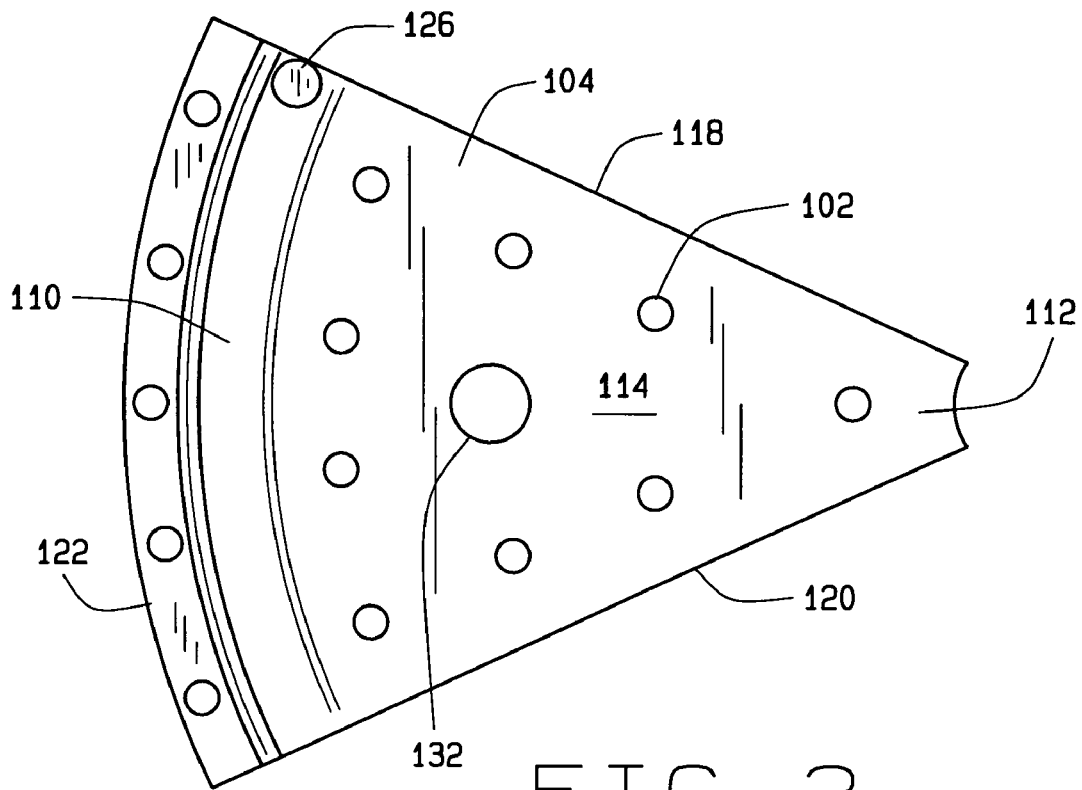
FIG. 2 is a plan view of an upper surface of a first embodiment of a partition member of the soil cover device.
Figure 3:
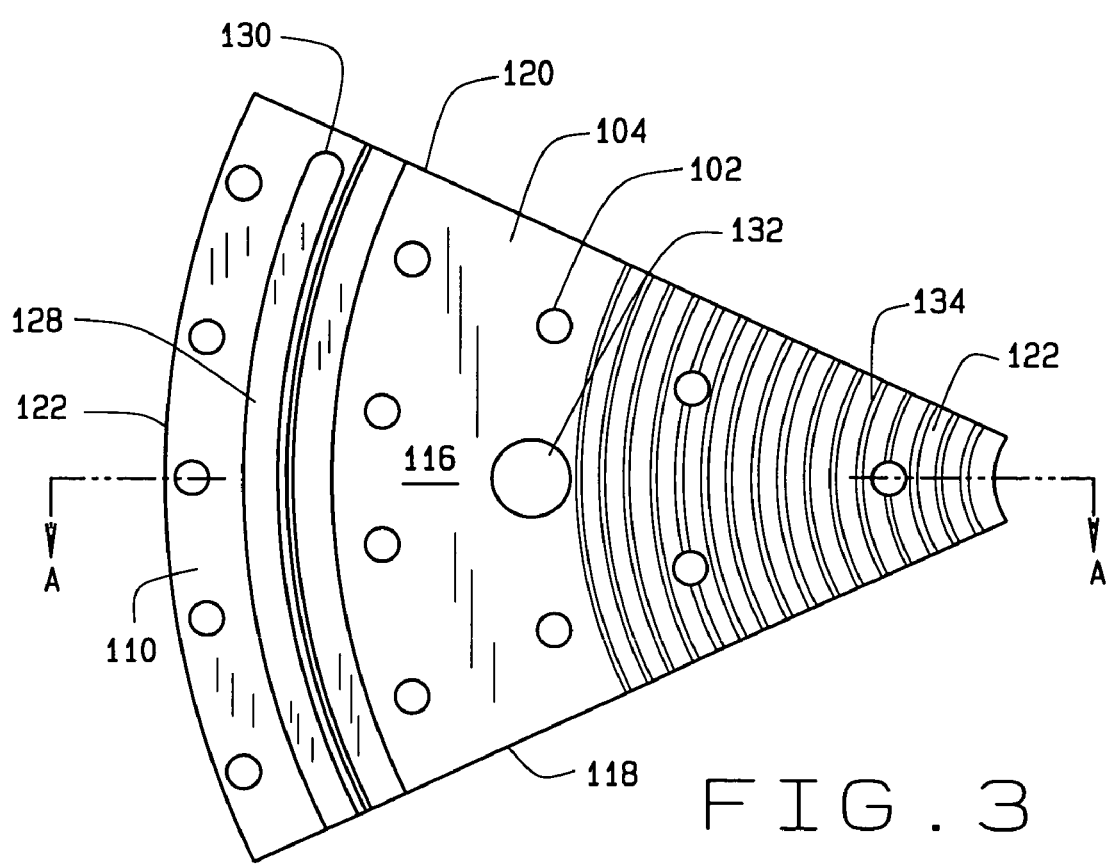
FIG. 3 is a plan view of a lower surface of the first embodiment of the partition member of the soil cover device.
Figure 6:
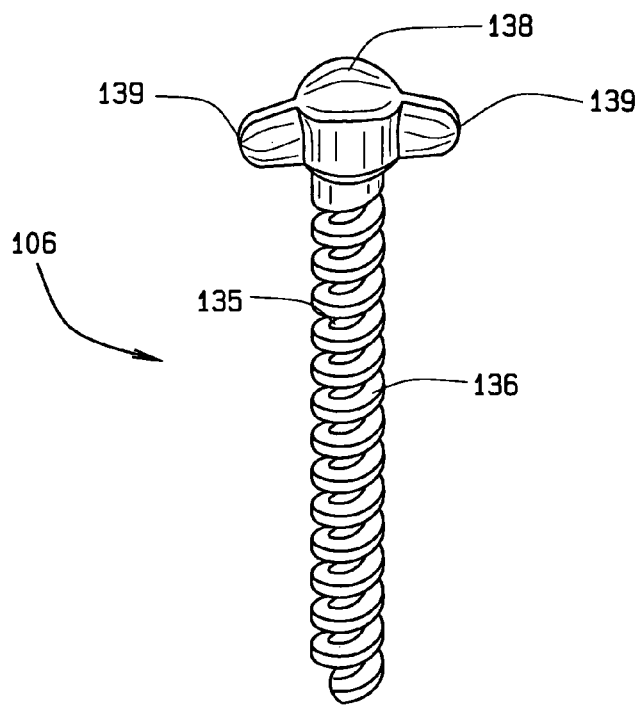
FIG. 6 is a perspective view of a first embodiment of an anchor.

In the first embodiment, each partition member 104 is a generally planar sector of a circle having a proximal end 110, a distal end 112, a upper surface 114, a lower surface 116, a leading edge 118, and a trailing edge 120 (FIGS. 2-4). The partition member 104 has a thickened portion 121 near the partition's proximal end 110, which is generally arcuate and has sloped inner and outer surfaces 121a and 121b. The proximal end 110 terminates in a lowered lip 122, which extends from the bottom of the outer surface 121b of the thickened portion 121 and is capable of seating on a container rim 124 or resting on the soil B proximate the container rim 124. The lowered lip 122 is preferably arcuately-shaped to correspond to the curvature of the cylindrical container 124 of the container A (FIG. 1), but can be any appropriate shape that corresponds to any shaped plant container.

At the proximal end 110 of the partition 104, a tab 126, extends from the upper surface 114 of the partition member 104 (and in fact extends from the top of the thickened portion 121) and is positioned adjacent to the leading edge 118 of the partition member 104. The tab 126, as best seen in FIG. 4, has a stem 126a projecting upwardly from the partition upper surface and an enlarged head 126b at the top of the stem 126a.

The tab head 126b is preferably round in plan view, but can be formed in other shapes as may be desired The lower surface 116 of proximal end 110 defines a slot 128 extending generally parallel with the lowered lip 122 for coupling with the tab 126. The slot 128 begins at the leading edge 118 and terminates at a stop 130 prior to the trailing edge 120. The slot 128 extends through the thickened portion 121 and is below the tab 126. The slot 128 is generally T-shaped and defines a channel 128a sized to receive the tab head 126b and an opening 128b in the channel through which the tab stem 126a can extend. The tab 126 and slot 128 are shaped and sized, such as with a clearance fit, to facilitate lateral and rotary movement of the tab 126 within the slot 128.

To assemble the soil cover device 100, the tab 126 of each partition member 104 is inserted into the opening of the slot 128 of an adjacent partition member 104 at the leading edge of the adjacent partition member so that the partition members 104 are positioned generally juxtaposed and parallel to each other with each leading edge 118 of one partition member 104 overlapping a trailing edge 120 of the adjacent partition member 104. In this position, each partition 104 is angled downwardly from the leading edge 118 to the trailing edge 120 so that each tab 126 properly engages with each respective slot 128. When completely assembled, the plurality of partitions 104 can be formed into a generally contiguous and circular arrangement with the center aperture 108 through which the plant C extends. This arrangement corresponds with the shape of the container A so that the lowered lip 122 of the partition members 104 rests along the container rim 124 (i.e., either inside diameter, or the top of the container rim 124). The tab/slot connection between adjacent partition members 104 allow the partition members 104 to pivot relative to each other above the tab stem 126a. Hence, the shape of the assembled soil cover device 100 can be adjusted to fit containers having a small range of dimensions, or even differently shaped containers.

At the distal end 112 of each partition member 104, the lower surface 116 defines a plurality of scores 134, preferably arcuately-shaped, which allow a user to break off and remove a predetermined portion of the distal end 112 to adjust the size of the aperture 108 formed when the partitions 104 are assembled. This allows the aperture 108 to accommodate different size plants C. As previously mentioned, each partition member 104 also includes a plurality of openings 102, preferably circularly shaped, which facilitate the passage of air, water, and fertilizer to the soil B. The size, shape, number, and placement of the openings 102 can be changed as desired. A through hole 132 is located generally at the middle of each partition member 104 for receiving the anchor 106.

In a first embodiment (FIG. 6), the anchor 106 includes a shank 135 having threads 136 terminating at an upper end with a handle 138. The overall diameter of the threads 136 are sized to have a clearance fit with the through hole 132 of the partition member 104. The handle 138 is shown to include a pair of ears 139, which extend outwardly. The handle 138 is sized so that at least a portion of the handle 138 is a larger than the diameter of the through hole 132 for engagement of the partition member upper surface 114. In operation, the shank 135 is inserted through the through hole 132 of the partition 104 and into the soil B. By turning the handle 138, the threaded shank 136 screws into the soil B until the handle 138 is secured firmly against the partition member upper surface 114. The ears 139 facilitate rotation of the anchor. However, the handle 138 and ears 139 could, for example, be replaced with a flat disc, which can be provided with a slot to receive a driver (such as a screwdriver, allen wrench, etc.). This will then present a relatively flat surface on the soil cover upper surface 114.

The threads 136 are sized to define a fairly large surface area. For example, the threads can have an overall diameter of about 0.75" and the shank 135 can have a diameter of about 0.25". Hence the threads have a diameter that is about three times greater than the shank diameter. Additionally, the threads 136 can have a fairly shallow slope. For example, the thread slope can be about 30°. In an alternative embodiment, the threads can have an overall diameter of about 0.25" and the shank 135 can have a diameter of about 0.125". Hence the threads have a diameter that is about two times greater than the shank diameter. In this alternative embodiment, the threads 136 can have a similarly shallow slope of about 30°. These dimensions and ratios allow for the soil B to be received between the threads 136. Further, when the plant is watered the soil B will become compacted about and between the threads. Thus, the threads 136 of the anchor 106 will securely hold the partition members 104 in place in the container A.

As shown in FIGS. 8A-C and 10A-10B, a second embodiment of the anchor 206 includes a shank 208 having a threaded upper end 210 for engagement with a nut 212, and an elongated pyramid-shaped fluke 214 at a lower end, which is capable of imbedding into the soil B to resist removal. The fluke 214 is positioned with an edge 216 pointing downwardly so that the edge 216 pierces through the soil B when the anchor 106 is inserted into the soil B. The diameter of the shank 208 is sized to have a clearance fit with any of the openings 102. Therefore, no through hole 132 is necessary in this embodiment. The nut 212 includes vertical grooves 218 to aid with gripping. In operation, the anchor 206 is inserted into the soil B so that the entire fluke 214 is imbedded. The anchor 106 can then be turned, for example, by approximately 90° to secure the fluke 214 within the soil B. The partition 104 is then placed over the anchor shank 208 so that the shank 208 extends through on of the partition openings 102. The anchor 206 should be positioned at a location and inserted to a depth that allows the threaded upper end 210 to protrude upwardly through one of the openings 102. The nut 212 is threaded onto the upper end 210 until the nut 212 is secured firmly against the partition member upper surface 114 and the lowered lip 122 is secured along the container rim 124.

As shown in FIGS. 9A-9B and 10A-10B, a third embodiment of the anchor 306 includes a shank 308 having a threaded upper end 310 for engagement with the nut 212, and an hollow cone-shaped fluke 314 at a lower end, which is capable of imbedding into the soil B to resist removal. The fluke 314 is positioned with a tip 316 pointing downwardly so that the tip 316 pierces through the soil B when the anchor 306 is inserted into the soil B. The diameter of the shank 308 is sized to have a clearance fit with any of the openings 102. Therefore, no through hole 132 is necessary in this embodiment. In operation, the anchor 306 is inserted into the soil B so that the entire fluke 314 is imbedded in the soil. The anchor 306 should be positioned at a location and inserted to a depth that allows the threaded upper end 310 to protrude upwardly through one of the openings 102 with the anchor imbedded in the soil. The partition 104 is placed over the soil B with the anchor shank 308 extending through one of the partition openings 102. The nut 212 is then threaded onto the shank upper end 310 until the nut 212 is secured firmly against the partition member upper surface 114 and the lowered lip 122 is secured along the container rim 124.

The soil cover device 100, including both the partition members and the anchors, can be manufactured from any suitable material, preferably a thermoplastic such as ABS, PVC and nylon, but also metal, ceramic, wood, composite, or combination thereof.

Additionally, the soil cover device 100 can be designed to withstand impact from falling objects, children and pets. The following four equations can be used to determine a designated thickness "t" of the partition members 104 needed to withstand a predetermined impact load from an object.

$$1) \quad PE = w \cdot h$$

where;
PE=Potential energy of object
w=weight of the object
h=Height of object $$2) \quad \varepsilon_y = \frac{\sigma_y}{E}$$

where;
$\epsilon_y$=Yield Strain
$\sigma_y$=Yield Stress
E=Young's Modulus $$3) \quad E_V = \frac{1}{2}\sigma_y \varepsilon_y$$

where;
$E_v$=Yield Energy per Unit Volume
$\sigma_y$=Yield Stress
$\epsilon_y$=Yield Strain $$4) \quad t = \frac{PE}{E_V \cdot \left(\left(\frac{\pi}{4}D^2 - \frac{\pi}{4}d^2\right) \cdot (1-H)\right)}$$

where;
t=Thickness of the Partition Member
PE=Potential Energy of Object
$E_V$=Yield Energy per Unit Volume
D=Outside Diameter of Soil Cover Device
d=Diameter of Aperture
H=Percentage of Material Removed for Openings As an example, these equations are used below to determine the thickness "t" necessary to withstand an impact load by a two (2) pound coffee mug falling from three (3) feet. For the purposes of this example, the soil cover device 100 has an outer diameter of twenty-two inches (22"), an aperture diameter of four inches (4"), and 25% of the material is removed for the openings.

$$1) \quad PE = w \cdot h$$
$$PE = 2 \text{lbf} \cdot 3 \text{ft} = 6 \text{ft} \cdot \text{lb}$$

$$2) \quad \varepsilon_y = \frac{\sigma_y}{E}$$
$$\varepsilon_y = \frac{719{,}500 \; psf}{3.3984 \cdot 10^7} = 0.02117 \; \frac{\text{ft}}{\text{ft}}$$

$$3) \quad E_V = \frac{1}{2}\sigma_y \varepsilon_y$$
$$E_V = \frac{1}{2}(719{,}500 \; psf)\left(0.02177 \; \frac{\text{ft}}{\text{ft}}\right) = 7{,}831 \; \frac{\text{ft} \cdot \text{lb}}{\text{ft}^3}$$

-continued $$4) \quad t = \frac{PE}{E_V \cdot \left(\left(\frac{\pi}{4}D^2 - \frac{\pi}{4}d^2\right) \cdot (1-H)\right)}$$

$$t = \frac{6 \text{ ft} \cdot \text{lb}}{7{,}831 \frac{\text{ft} \cdot \text{lb}}{\text{ft}^3} \cdot \left(\left(\frac{\pi}{4}(1.833 \text{ ft})^2 - \frac{\pi}{4}(0.3333 \text{ ft})^2\right) \cdot (1-0.25)\right)}$$

$$= 0.004804 \text{ ft}$$
$$= 1.46 \text{ mm}$$

Those skilled in the art will recognize that the size and shape of various elements of the partition 104 can be modified without departing from the scope of the invention. For example, the tab 126 and slot 128 can be any suitable size and shape that facilitates lateral and rotary movement of the tab 126 within the slot 128, including but not limited to spheroid, catenoid, cylindrical, and the like. In addition, the slot 128 can begin and end at different locations, such as the slot 128 beginning adjacent to the leading edge and having an opening to receive the tab. Also, the openings 102 can be any size or shape that facilitates the passage of air, water, and fertilizer to the soil, such as rectangular, elliptical, obround, orthogonal, or any combination thereof. The anchors can be sized differently as, for example, the anchor 106 could be made to have a smaller diameter to pass through the holes 102.

Figure 7:
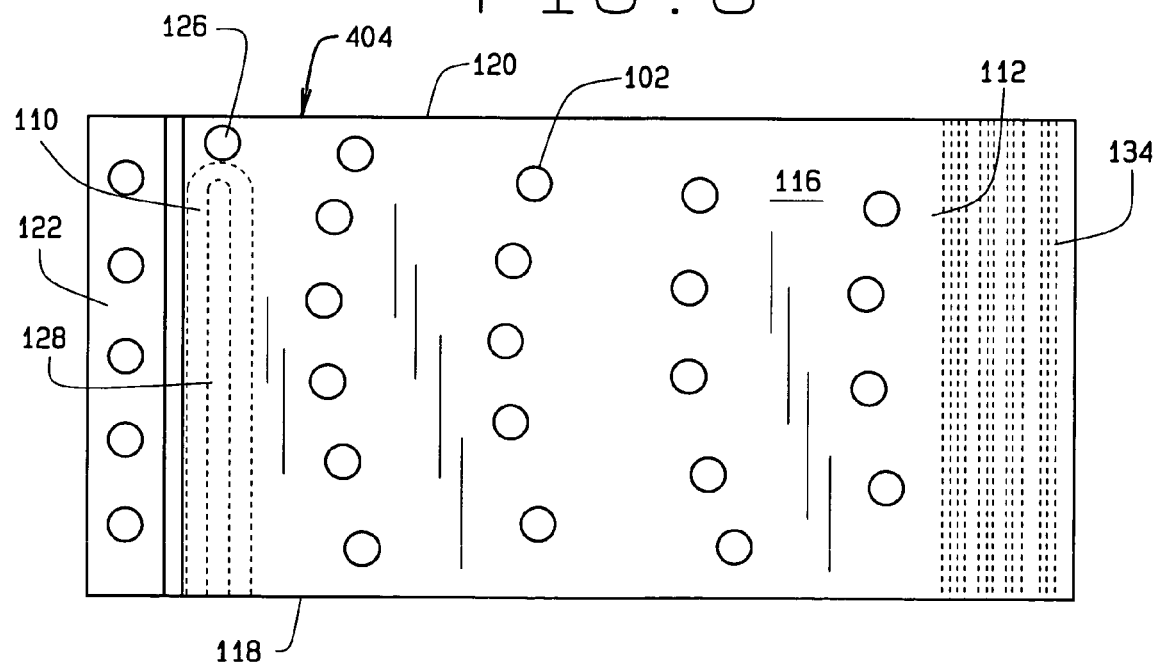
FIG. 7 is a plan view of an upper surface of a second embodiment of a partition member.
Figure 8A:
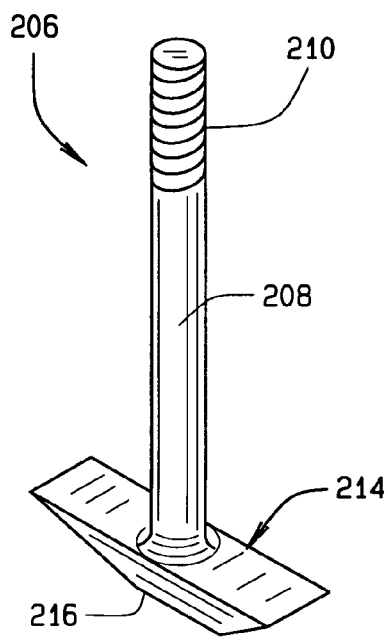
FIG. 8A is a perspective view of a second embodiment of the anchor.
Figure 8B:
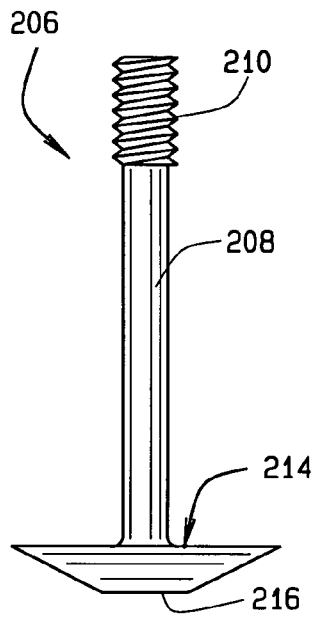
FIG. 8B is a front elevation view of the second embodiment of the anchor.
Figure 8C:
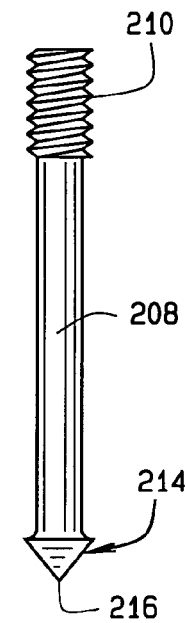
FIG. 8C is a side elevation view of the second embodiment of the anchor.
Figure 9A:
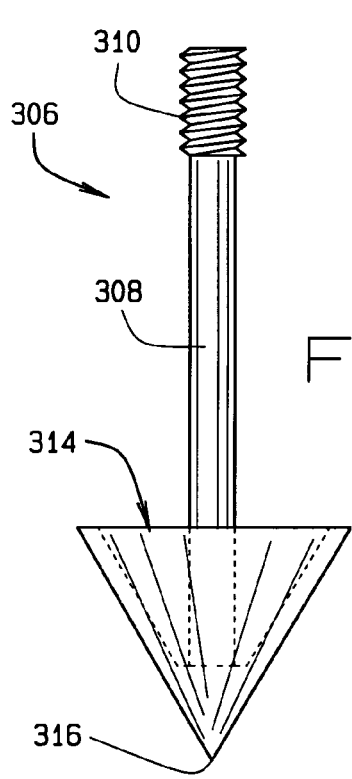
FIG. 9A is a front elevation view of a third embodiment of the anchor.
Figure 9B:
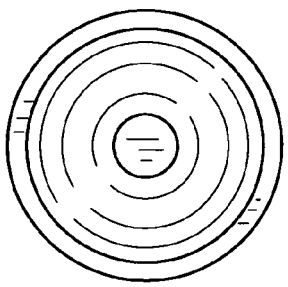
FIG. 9B is a top plan view of the third embodiment of the anchor.
Figure 10A:
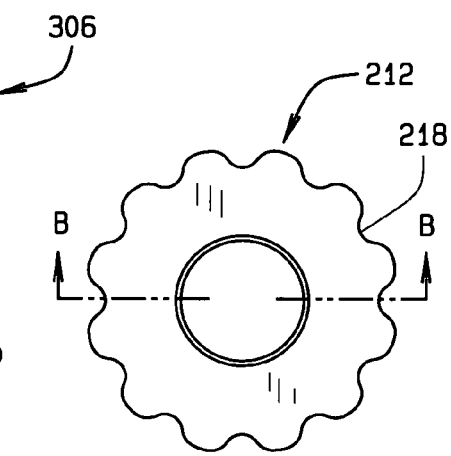
FIG. 10A is a plan view of a nut for use with the anchors of FIGS. 8A-9B.
Figure 10B:
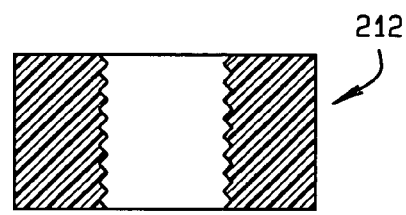
FIG. 10B is a sectional view of the nut along line B-B of FIG. 10A.

Additionally, other sizes and shapes of partition members 104 can be used to accommodate various sizes and shapes of plant containers, including but not limited to, rectangular, elliptical, obround, orthogonal, or any combination thereof. For example, the rectangular shaped partition member 404 of FIG. 7 can be used in conjunction with the partition members 104 to form an oval soil cover.

Changes can be made in the above constructions without departing from the scope of the invention, it is intended that all matter contained in the above description or shown in the accompanying drawings shall be interpreted as illustrative and not in a limiting sense.

What is claimed is:

1. A soil cover comprising:
a plurality of partition members; the partition members each comprising:
a first surface, a second surface opposite said first surface, a trailing side edge, a leading side edge, an inner edge, and an outer edge; the partition members having at least one opening that facilitates the passage of air, water, and fertilizer to soil within the container; the partition members, when assembled, defining an aperture through which a plant can extend;
a tab having a neck and an enlarged end; said tab projecting from said first surface of each partition member generally normally to a plane defined by said first surface;
an elongated arcuate slot in said second surface of each respective partition member; said elongated slot being aligned with said tab; said elongated slot being adapted to receive the tab of an adjacent partition member; the elongated slot defining a channel and an upwardly facing elongate opening into said channel; said opening being narrower than said channel and being spaced inwardly from the outer edge of said second surface; said channel being sized and shaped to receive the enlarged end of said tab of an adjacent partition member and the slot opening being sized to receive the neck of said tab of said adjacent partition member; whereby, when adjacent partition members are connected, the tab of one partition member is slidingly and pivotally received in the slot of an adjacent partition member such that the angular position of one partition member relative to an adjacent partition member can be selectively adjusted; and the relative shape of said slot and tab prevents substantial movement of the connected partition members relative to each other in a vertical plate at the connection of the tab and slot, and the trailing side edge of each partition respective member overlaps the leading side edge of an adjacent partition member so that the plurality of partition members are positioned generally juxtaposed to each other to form the cover; and at least one anchor sized to pass through the at least one opening and being adapted to engage the soil to removably secure the cover in the container.

2. The soil cover of claim 1, wherein each partition member comprises:

at least one score on one of said first and second surfaces and positioned for removal of a predetermined portion of the partition member for adjustment of the size of the aperture.

3. The soil cover of claim 1, wherein the tab and the slot are sized with a clearance fit to facilitate lateral and rotary movement of the tab within the slot.

4. The soil cover of claim 1, wherein the at least one anchor comprises:

a shank having threads sized and shaped to be capable of removably imbedding into the soil to removably secure the soil cover to the container.

5. The soil cover of claim 1, wherein the at least one anchor further comprises:

a handle sized with at least a portion of the handle being larger than the at least one opening so that the handle can engage an upper surface of the partition member and secure the soil cover in the container.

6. The soil cover of claim 1, wherein the at least one anchor further comprises:

a fluke at one end of the shank capable of removably imbedding into the soil to removably secure the soil cover to the container; and a shank having threads at an end opposite the fluke, the shank being sized so that the threads can extend through the at least one opening of the partition member; and a nut capable of engaging with the threads to secure the nut against an upper surface of the partition member and secure the soil cover.

7. The soil cover of claim 6, wherein the fluke comprises an elongated pyramid having an edge pointing downwardly from the shank.

8. The soil cover of claim 6, wherein the fluke comprises a hollow cone having a tip pointing downwardly from the shank.

9. The soil cover of claim 1, wherein the plurality of partition members have a predetermined thickness as characterized by:

a. $$t = \frac{PE}{E_V \cdot ((\frac{\pi}{4}D^2 - \frac{\pi}{4}d^2) \cdot (1-H))}$$

where,
t is a thickness of each partition member;
PE is a potential energy of a predetermined object;
$E_v$ is a yield energy per unit volume;
D is an outside diameter of the soil cover device;
d is a diameter of an aperture; and
H is a percentage of material removed for openings.

10. A soil cover comprising:

a plurality of partition members, the partition members having a first surface, a second surface opposite said first surface, a trailing side edge, a leading side edge, an inner edge, an outer edge, at least one opening that facilitates the passage of air, water, and fertilizer to soil within the container; the partition members, when assembled, defining an aperture through which a plant can extend;

a tab having a neck and an enlarged end projecting from said first surface of each partition member generally normally to a plane defined by said first surface;

an elongated arcuate slot in said second surface of each respective partition member; the elongated slot being sized and shaped to receive the tab of an adjacent partition member; the elongated slot defining a channel and an upwardly facing elongate opening into said channel; said opening being narrower than said channel and being spaced inwardly from the outer edge of said second surface; said channel being sized and shaped to receive the enlarged end of said tab of an adjacent partition member and the slot opening being sized to receive the neck of said tab of said adjacent partition member; whereby when adjacent partition members are connected, the tab of one partition member is slidingly and pivotally received in the slot of an adjacent partition member such that the angular position of one partition member relative to an adjacent partition member can be selectively adjusted; and the relative shape of said slot and tab prevents substantial movement of the connected partition members relative to each other in a vertical plate at the connection of the tab and slot, and the trailing edge of each partition respective member overlaps a leading edge of an adjacent partition member so that the plurality of partition members are positioned generally juxtaposed to each other to form the cover; and at least one means for anchoring the soil cover in the container.

11. The soil cover of claim 10, wherein the means for anchoring comprises:

a shank having threads capable of removably imbedding into the soil to removably secure the soil cover to the container.

12. The soil cover of claim 11, wherein the means for anchoring further comprises:

a handle sized with at least a portion of the handle being larger than at least one of the openings so that the handle can engage an upper surface of the partition member and secure the soil cover to the container.

13. The soil cover of claim 10, wherein the means for anchoring comprises:

a fluke at one end of the shank, the fluke being capable of removably imbedding into the soil to removably secure the soil cover to the container; and a shank having threads and being sized so that the threads can extend through the openings of the partition member; and a nut capable of engaging with the threads to secure the nut against an upper surface of the partition member and secure the soil cover.

14. The soil cover of claim 13, wherein the fluke comprises an elongated pyramid having an edge pointing downwardly from the shank.

15. The soil cover of claim 13, wherein the fluke comprises a hollow cone having a tip pointing downwardly from the shank.

16. The soil cover of claim 10, wherein each partition member comprises:
   at least one score on one of said first and second surfaces and positioned for removal of a predetermined portion of the partition member for adjustment of the size of the aperture.

17. A soil cover comprising:
   a plurality of partition members, each partition member having at least one opening that facilitates the passage of air, water, and fertilizer to soil within the container, the plurality of partition members, when assembled, defining an aperture through which a plant can extend;
   at least one anchor that extends through at least one partition member to partially imbed into the soil, the at least one anchor having a shank with threads capable of removably imbedding into the soil to removably secure the soil cover to the container;
   at least one score positioned for removal of a predetermined portion of each partition member for adjustment of the size of the aperture;
   a tab having a neck and an enlarged end; said tab projecting from a first surface of each partition member; and
   an elongated arcuate slot in said second surface of each respective partition member; said elongated slot being adapted to receive the tab of an adjacent partition member; the elongated slot defining a channel and an upwardly facing elongate opening into said channel; said opening being narrower than said channel and being spaced inwardly from the outer edge of said second surface; said channel being sized and shaped to receive the enlarged end of the tab of an adjacent partition member and the slot opening being sized to receive the neck of said tab of said adjacent partition member; and
   wherein when adjacent partition members are connected, the tab of one partition member is slidingly and pivotally received in the slot of an adjacent partition member such that the angular position of one partition member relative to an adjacent partition member can be selectively adjusted; and the relative shape of said slot and tab prevents substantial movement of the connected partition members relative to each other in a vertical plane at the connection of the tab and slot; and wherein a trailing edge of each respective partition member overlaps a leading edge of an adjacent partition member so that the plurality of partition members are positioned generally juxtaposed to each other to form the cover.

* * * * *